United States Patent [19]

Fujii

[11] 3,883,675

[45] May 13, 1975

[54] METHOD FOR PREPARING BLAND CASEINATES

[75] Inventor: Joanne G. Fujii, Chicago, Ill.

[73] Assignee: Beatrice Foods Company, Chicago, Ill.

[22] Filed: July 28, 1972

[21] Appl. No.: 276,168

[52] U.S. Cl. .............. 426/656; 260/120; 426/471; 426/495
[51] Int. Cl. ............................................. N23j 1/20
[58] Field of Search ............ 99/20, 17, 14; 260/120, 260/119; 426/364, 212, 356, 360, 185, 186

[56] References Cited
UNITED STATES PATENTS

| | | | |
|---|---|---|---|
| 2,401,919 | 6/1946 | Ender | 260/119 |
| 3,040,018 | 6/1962 | Wingerd | 260/120 |
| 3,420,811 | 1/1969 | Wieren et al. | 99/20 |
| 3,535,304 | 10/1970 | Muller et al. | 99/20 |
| 3,579,354 | 5/1971 | Kasik et al. | 260/120 |

*Primary Examiner*—Raymond N. Jones
*Assistant Examiner*—Thomas G. Wiseman
*Attorney, Agent, or Firm*—Cushman, Darby & Cushman

[57] ABSTRACT

Bland caseinates are produced by heating a solution of an alkaline earth salt to a temperature of at least 170°F and mixing therewith an alkali or alkaline earth caseinate. A coagulum forms and is separated from the mother liquid. After washing and drying, the coagulum is free of objectionable odors and taste normally associated with caseinates. The bland caseinates may be incorporated in substantial amounts in food products. The preferred caseinate is sodium caseinate and the preferred alkaline earth salt is magnesium chloride.

14 Claims, No Drawings

METHOD FOR PREPARING BLAND CASEINATES

This application relates to my copending application entitled BLAND CASEINATES, Ser. No. 276,169, the entire disclosure of which is incorporated herein by reference.

The present invention relates to an improved method of producing a bland caseinate and to an improved product obtained thereby. More particularly, the invention relates to improved caseinates which do not contain the objectionable flavor and odor normally associated with caseinates, and which, therefore, allows the incorporation of the present caseinates in substantial amounts in food compositions.

As is well known in the art, caseinates are valuable sources of protein and may be used to substantially upgrade the protein content of food compositions. However, caseinates have very objectionable odors and flavors, and, therefore, can be incorporated into foods only in relatively small proportions. Otherwise, the objectionable odor and flavor of the caseinates can easily override the natural flavor of the food and result in a food composition which is not acceptable from a flavor and odor point of view. A number of methods have been described in the art for removing the objectionable odor and flavor of caseinates and these methods do, generally, reduce the degree of objectionable odor and flavor, at least to some extent. However, none of the known methods are capable of producing caseinates with such low levels of objectionable flavor and odor as to allow the use of substantial amounts of caseinates in food compositions. Thus, heretofore, the amount of caseinates which could be used in food compositions has been severely limited. However, from a nutritional point of view, it would be desirable to provide caseinates which have very low levels of objectionable odors and flavors and which, therefore, allow substantial amounts to be incorporated in food compositions.

The invention disclosed in the above-identified copending application provides a method for producing bland caseinates which can be incorporated into food compositions in substantial amounts. Briefly, the invention of the said copending application allows the removal of the objectionable odor and taste constituents of caseinates by preferential separation of a solution of the alkali or alkaline caseinate and an alkaline earth salt. A solution of an alkaline earth salt and the caseinate is heated to cause coagulation of the protein, and the resulting coagulum can be separated from the liquid and the coagulum, after washing, is essentially a bland caseinate. The caseinate may be any of the alkali or alkaline earth caseinates, especially sodium caseinate and calcium caseinate, and the alkaline earth salt may be any salt, e.g., a nitrate, carbonate, sulfate, acetate or halide, but the halide is the preferred salt and the chloride or fluoride is the best mode. Since the method of the present invention depends upon the solution of both the alkaline earth salt and the caseinate, it is preferred that the more soluble forms of each be used. The preferred embodiment of the invention uses magnesium chloride and sodium caseinate. The caseinate and halide may be dissolved in any suitable solvent, but for ease and simplicity of operation the solvent is preferably substantially an aqueous solvent, e.g., only water.

In more detail and as illustrated by the preferred embodiments the process of the said copending application is as follows. A water solution of magnesium chloride and sodium caseinate is prepared, preferably by first dissolving the magnesium chloride in the water and then dissolving the sodium caseinate in the resulting solution. The solution is slowly heated to a temperature of at least 140° F. and up to 155° F., especially to a temperature of about 147° F. ± 3° F. The heating step is slow enough that the protein of the sodium caseinate is not adversely affected, i.e., not substantially denatured or like disruption of the protein moiety. The heating is continued until the protein in the solution coagulates. The coagulation of the protein will be in the form of a rather frothy or cellular-like solid, which coagulum will have a density less than the density of the liquid. Therefore, the coagulum will rise to the top of the mother liquid. After the coagulum has formed at the top of the mother liquid, the coagulum and mother liquid are cooled, and the mother liquid is removed from the coagulum. The coagulum is then washed with water to remove any additional portions of the mother liquid which is occluded in the coagulum. The washing may be carried out a number of separate times in order to insure that, substantially, all of the mother liquid is removed from the coagulum. The mother liquid and the wash liquid will contain most of the objectionable odor and flavor substituents of the original caseinate, and after removal of these liquids from the coagulum, the coagulum will retain very low levels to essentially none of the objectionable odor and flavor substituents. To insure good separation of the coagulum from the mother liquid, the coagulum may be pulverized before or during washing. After the washing step, the coagulum may be broken up or pulverized, if not broken before or during the washing step, and dried, e.g., spray dried to form a spray-dried powder. It is preferred that the coagulum be pasteurized under conventional conditions at some point after the coagulum has been produced. In this regard, if the coagulum is suspended in water and spray dried, at conventional spray drying temperatures, then the pasteurization step will be accomplished.

With the bland caseinate of the said copending application, a foodstuff may contain up to 40% by weight thereof, as opposed to conventional bland caseinates wherein, normally, less than 5% may be used. Thus, a significant increase in valuable protein may be obtained in conventional food compositions.

The process of that invention, however, does require that the solution of caseinate and alkaline earth salt be slowly heated to the elevated temperatures described therein. This slow heating, therefore, does require careful control and does not allow for rapid throughput of caseinate through conventional heating apparatus. It would, therefore, be advantageous to provide a method of producing the bland caseinates of the aforementioned copending application in a manner which required less precise process control and which allowed a greater throughput of the caseinates in processing apparatus.

Accordingly, it is an object of the present invention to provide an improved method of producing the caseinates of the aforementioned copending application. It is a further object to provide improved bland caseinates produced by the present process. It is yet a further object to provide food compositions containing the present improved bland caseinates. Other objects will be apparent from the following disclosure and claims.

Briefly stated, the present invention is based on the discovery that the slow heating step of the aforementioned application can be obviated and that improved bland caseinates can be provided by dissolving the alkaline earth salt in a fluid medium, heating the salt solution to a temperature of at least about 170°F, and thereafter rapidly mixing the caseinate with the heated salt solution. The caseinates may be added to the hot salt solution in a dry, dispersed or dissolved form but the manner of adding and mixing the dry caseinate is far more demanding in precision and requirements.

As in the aforementioned copending application, the amount of magnesium chloride, on a weight basis, may be from as little as 20% up to as much as 60% of the weight of the sodium caseinate, but more generally between 22% and 28% is preferred. This is true whether a dry form, a dispersion or solution of the caseinate is mixed with the heated salt solution. The amount of caseinate dissolved when a solution is used may be up to saturation amounts, but from at least 1% up to about 30% by weight of the solvent, e.g., between 5% and 15%, especially about 10%, may be used.

When a solution of the caseinate is used, the mixing of the caseinate solution with the salt solution should be accompanied with such rapid stirring that an immediate and intimate contact of the solutions result. Upon this mixing, a coagulum will begin to form and with continued mixing, while maintaining the temperature of the mixed solutions above 170°F, additional coagulum will form. After the coagulum is formed during mixing, the coagulum is treated thereafter in the same manner as described in said copending application. Thus, the coagulum is washed and dried, along with appropriate pasteurization and grinding, as desired. The product produced is quite similar to the product of said copending application, but is improved from the point of view that essentially no objectionable odor and flavor substituents remain in the coagulum and this can be insured even in the absence of extensive washing.

The method is the same as described above when the caseinates are in the dry form or dispersed in a liquid. Thus, while dry caseinate can be simply added to the salt solution, this mode of addition requires a more careful and precise condition to avoid lumping of the caseinate and poor yield of the coagulum. Accordingly, it is preferred that the caseinate at least be dispersed in a small amount of liquid and more preferably dissolved in a solvent as noted above. The dispersing liquid may or may not be heated as desired, but if the liquid is not heated, then the amount thereof should be sufficiently low that upon its addition to the heated salt solution, the temperature of the mixture will not drop below 170°F. Of course, heating during addition will mitigate this concern. If the liquid is heated, it may be heated from just above room temperature all the way to above 170°F, but in this situation, with the usual solvent of water, substantial solution of the caseinate will take place and this method step then becomes similar to the addition of a solution of the caseinates. Of course, in a like manner, when the solution of the caseinates is used, the solution should either contain such a small amount of solvent so as to not decrease the temperature of the mixture to significantly below 170°F or added so slowly as to prevent such a temperature drop or the solution may be heated, e.g., to 170°F or above, which is the preferred embodiment.

In other respects, the parameters of the aforementioned copending application are equally applicable to the present method. Thus, the same caseinates and alkaline earth salts are useful in the present method, along with the same solvents and washing liquids. Also, as noted above, the subsequent steps of washing, pasteurizing, grinding, etc., are the same as those of the said copending application. Thus, the coagulum is separated from the mother liquid and washed to remove remaining mother liquid therefrom. The coagulum may be broken up either prior to or during the washing step and the washing step may be repeated a plurality of times. Of course, the washing liquid should be a substantial non-solvent for the coagulum and quite suitably water is used as the washing liquid. In this latter case, the wash water should be at a temperature below 85°F. Also, as in the aforementioned application, the preferred caseinate is sodium caseinate and the preferred alkaline earth salt is a halide, i.e., magnesium chloride.

For most uses, as in the aforementioned copending application, the washed coagulum is dried and the drying should be conducted at temperatures below 400°F, e.g., 250°F. Preferably, the coagulum is spray dried. The coagulum should be pasteurized at some time during the process, which will inherently take place at the 170°F mixing temperature if the coagulum is allowed to dwell at that temperature for at least one minute. No further pasteurization is required if precautions are thereafter taken to prevent recontamination of the coagulum. Otherwise, a terminal pasteurization can be accomplished prior to or during drying of the coagulum. In this regard, spray drying at conventional temperatures, e.g., 320°/200°F (inlet/outlet) will terminally pasteurize the coagulum and produce a stable product.

The dried product may be incorporated into any edible foodstuffs for animals, including humans, such as milk products, confectionaries, meats, vegetables, fruits and grains in the same manner as disclosed in said copending application.

The invention will be illustrated by the following examples, but the invention is not limited thereto and is fully applicable to the foregoing disclosure.

EXAMPLE 1

100 grams of sodium caseinate are dissolved in 1,000 grams of distilled water with stirring at 86°F. 32 grams of magnesium chloride are dissolved with stirring in 1,000 grams of water at 86°F. The two solutions are rapidly heated to 200°F and immediately mixed in a heated vessel equipped with a high-speed stirrer. Upon mixing, a coagulum forms and with continued stirring and heating for ten minutes, a frothy, cellular coagulum is dispersed in the liquid. Stirring is stopped and the coagulum rises to the top of the liquid. The liquid is decanted from the coagulum and the coagulum is allowed to cool to room temperature. The coagulum is then suspended in water at room temperature, and subjected to a high-speed mixer which breaks the coagulum to average particle sizes of about 1/32 of an inch. The so pulverized coagulum is separated from the water by filtration, suspended in fresh water at room temperature and again stirred and filtered. This washing is performed two additional times. The coagulum is then pulverized with a mortar and pestle, suspended in water and sprayed at 350° F. inlet, 200° F. outlet temperatures to a fine powder. The resulting powder is free of objectionable odor and taste.

EXAMPLE 2

Example 1 is repeated, except that the sodium caseinate is suspended in 100 grams of water, instead of being dissolved in 1,000 grams of water. The suspension is not heated but is simply slowly added to the solution of magnesium chloride which is heated to 210.2°F. The magnesium chloride is contained in a vessel equipped with an ultra-high-speed mixer (a Cowles dissolver). Mixing is immediate and coagulum forms rapidly. The coagulum is processed in the same manner as Example 1, and produces a powder identical to the power of Example 1.

While the foregoing process and that of the aforementioned copending application are directed to caseinates, the processes may also be practiced with soy protein, but in those cases a frothy coagulum does not necessarily result but a precipitate is usually formed and can thereafter be treated in the aforementioned processes. For example, 45 pounds of a 33% water suspension of defatted, low toast soy protein (Swift Y-30) is autoclaved at 15 p.s.i.g. and mixed into 200 pounds of approximately a 2½% solution of MgCl at 176°F. The precipitate is separated from the mother liquid, washed with 60°F water, dried at 180°F in a tray-dryer and pulverized to produce bland soy protein powder.

I claim:

1. A method of producing a bland caseinate comprising preparing a solution of an alkaline earth salt selected from a nitrate, carbonate, sulfate, acetate and halide, heating the solution to a temperature of at least 194°F., adding to the solution with stirring an alkali or alkaline earth caseinate while maintaining said temperature and dissolving the said caseinate, allowing a coagulum to form, separating the coagulum from the mother liquid and washing the coagulum, the caseinate being in the solution in an amount of between 1 and 30 w/w% and the said salt being in the solution in an amount of between 20 and 60 w/w% based on the weight of the caseinate.

2. The method of claim 1, wherein the coagulum is broken prior to or during the washing step.

3. The method of claim 1, wherein the washing step is repeated a plurality of times.

4. The method of claim 1, wherein the wash liquid is a non-solvent for the coagulum.

5. The method of claim 4, wherein the wash liquid is water.

6. The method of claim 5, wherein the water wash is at a temperature below 85°F.

7. The method of claim 1, wherein the caseinate is sodium caseinate.

8. The method of claim 1, wherein the alkaline earth salt is a halide.

9. The method of claim 8, wherein the halide is the magnesium chloride.

10. The method of claim 1, wherein the salt solution is an aqueous solution.

11. The method of claim 1, wherein the said percentage of the salt is 30% to 33%.

12. The method of claim 1, wherein the washed coagulum is dried.

13. The method of claim 12 wherein the drying is conducted at a temperature below 400°F.

14. The method of claim 13, wherein the coagulum is spray dried.

* * * * *